3,819,798
OXIDATION OF METAL SULFIDE ORES WITH ORGANIC HYDROPEROXIDES

Rudolph Rosenthal, Broomall, Pa., assignor to Atlantic Richfield Company, New York, N.Y.
No Drawing. Filed May 23, 1972, Ser. No. 256,000
Int. Cl. B01d 11/00; C22b 11/00
U.S. Cl. 423—41
20 Claims

ABSTRACT OF THE DISCLOSURE

Metal sulfides ores such as galena (lead sulfide) are oxidized to the salt and to free sulfur by contacting with an organic hydroperoxide in the pressence of a strong mineral acid, such as sulfuric acid and the metal salt is then the sulfate. The metal sulfate can be converted to the metal and sulfuric acid by known technology and the free sulfur is also recovered by conventional methods. The process is advantageous in being non-polluting since no sulfur dioxide is produced.

BACKGROUND OF THE INVENTION

This invention relates to a method for oxidizing metal sulfide ores utilizing a secondary or tertiary organic hydroperoxide in the presence of a strong mineral acid such as sulfuric acid, phosphoric acid and the like to produce the corresponding metal salt and free sulfur and avoiding the production of $SO_2$ which is normally produced by conventional roasting methods.

Early in 1971 the Environmental Protection Agency issued air quality standards that were sufficiently stringent such that many copper and lead smelters employing roasting methods for conversion of the sulfide ore to $SO_2$ and the metal may be either closed down or forced to install exceedingly costly $SO_2$ recovery methods. In addition, certain states such as Arizona, Montana, and Nevada, wherein a large number of copper smelters are located have issued additional requirements such that sulfur emissions must be reduced by 90 percent in order to protect not only human health but also to protect property and vegetation.

Shortly after World War II pressure-hydrometallurgical processes were developed which could process low grade ores, industrial residues and secondary materials. Some five such pressure-hydrometallurgical plants were constructed primarily for the purpose of supplying the temporary requirements of the strategic materials stockpile program of the United States Government. Of these plants only two remained in operation after the United States Government contracts expired, one of which was located in Canada and the other in the United States. The pressure-hydrometallurgical processes were all founded on the basic principle of dissolving the metal values in a suitable aqueous medium and recovering the metals either as the pure metal or as compounds from the metal rich solution. These plants were primarily employed in the recovery of nickel, copper and cobalt. In addition, work in this field has been directed to the processing of complex copper-zinc-lead ores. A number of these commercial plants employed ammonia, oxygen and water under pressure and at elevated temperatures. Others used acid leaching and pressure oxidation with air or oxygen.

It has also been proposed to treat various metal sulfides such as nickel sulfide, cobalt sulfide, as well as lead, copper, cadmium and manganese sulfides with hydrogen peroxide (20 percent) to convert the sulfides into sulfates or hydroxysulfates in two stages, see Chemical Abstracts, 74 (1971), 60390q.

All of these processes have certain disadvantages, for example the conventional smelters employing roasting of sulfide ores will be forced to install exceedingly costly sulfur dioxide recovery methods or be shut down. The pressure-hydrometallurgical processes proved to be too costly although they might now be competitive in view of the high cost of modifying conventional smelters. The proposed hydrogen peroxide method likewise would be exceedingly costly since hydrogen peroxide has a high initial cost and is converted only to water not a valuable by-product. Moreover, it would require on a theoretical basis, 4 moles of hydrogen peroxide per mole of metal sulfide to produce the sulfate. Thus, while the latter two processes, i.e. pressure-metallurgy and the proposed hydrogen peroxide method, avoid the production of $SO_2$ they also suffer from high costs.

The method of the instant invention wherein an organic hydroperoxide is utilized in conjunction with a mineral acid such as sulfuric acid has the advantage of utilizing a lower cost oxidizing agent, i.e. and organic hydroperoxide which is converted to a valuable by-product and, in addition, when used in conjunction with a mineral acid such as sulfuric acid requires only a 1:1 mole ratio of metal sulfide to hydroperoxide to produce the metal sulfate and free sulfur. The metal sulfate can be converted to the metal and sulfuric acid by known technoloky and the free sulfur can also be recovered by known technology. The method of the instant invention is, of course, also non-polluting since it does not produce sulfur dioxide. Finally, it is believed that the method of the instant invention would be less costly than modifying conventional roasting smelters, pressure-metallurgical processes or the use of hydrogen peroxide.

Commercial processes are now in existence for the production of the secondary and tertiary organic hydroperoxides which are particulraly suitable for use in this invention. For example, in one commercial process, isobutane is oxidized with oxygen to produce a mixture of tertiary butyl alcohol and tertiary butyl hydroperoxide in approximately equal quantities with only minor amounts of other oxygenated by-products. After utilization in the process of this invention the tertiary butyl hydroperoxide is reduced to tertiary butyl alcohol which alcohol has been found to be an excellent additive for motor fuels, i.e. gasoline, as a replacement for lead in increasing the octane number of such fuels and also providing carburetor anti-icing characteristics to the fuel. Alternatively, the tertiary butyl alcohol can be readily dehydrated to isobutylene, a valuable article of commerce. Similiarly, ethylbenzene hydroperoxide is converted to the corresponding alcohol which in turn can be dehydrated to styrene. Likewise, other hydroperoxides are converted to their alcohols which in turn may be utilized industrially or converted into valuable industrial products.

SUMMARY OF THE INVENTION

In accordance with the method of this invention a metal sulfide ore after conventional concentration is contacted in the liquid phase with an organic hydroperoxide and preferably with a dilute mineral acid at moderate temperatures, e.g. 50° C., and atmospheric pressure to produce the corresponding metal salt and free sulfur. With sulfuric acid, which is one of the preferred acids, the metal salt is the sulfate. The metal can be recovered from the metal sulfate along with sulfuric acid in accordance with known technology and the sulfur likewise can be recovered by known technology.

It is an object of this invention therefore to provide a method for the conversion of metal sulfide ores to metal salts and free sulfur while avoiding the production of sulfur dioxide or other polluting compounds.

It is another object of this invention to provide a method wherein an organic hydroperoxide in conjunction with a mineral acid is utilized to convert the metal sulfide ore to the metal salt and sulfur.

It is another object of this invention to provide a method for the conversion of a metal sulfide ore utilizing an organic hydroperoxide and sulfuric acid to produce the metal sulfate, free sulfur and the alcohol corresponding to the organic hydroperoxide as a useful by-product.

Other objects of this invention will be apparent from the following description which includes the preferred embodiments of the invention and also from the claims.

DESCRIPTION OF THE INVENTION

In recent years commercial methods for the production of organic hydroperoxides have been developed and are in use on a commercial scale. For example, isobutane is thermally oxidized with molecular oxygen to produce approximately equimolar quantities of tertiary butyl hydroperoxide and tertiary butyl alcohol with very minor amounts of other oxygenated products. Likewise, a commercial plant for the production of ethylbenzene hydroperoxide by the oxidation of ethylbenzene will be in operation in the very near future. Similar technology is available for the production of cumene hydroperoxide, cymene hydroperoxide, cyclohexane hydroperoxide and similar organic hydroperoxides including amyl hydroperoxide. These organic hydroperoxides which are either secondary or tertiary hydroperoxides are the preferred compounds for use in this invention, however, in general any organic hydroperoxide can be employed having the formula ROOH wherein R is alkyl, aralkyl, cycloalkyl and alkyl substituted cycloalkyl and the hydroperoxide group is attached to a secondary or tertiary carbon atom. Tertiary butyl hydroperoxide and ethylbenzene hydroperoxide are particularly preferred. These hydroperoxides provide a convenient source of available oxygen which is readily controlled for use in liquid phase oxidation reactions.

A very large number of metals occur in nature in the form of sulfide ores, for example the metals of Group I–B, II–B, IV–A, V–A, VII–B and VIII of the Periodic Table are the metals which are found frequently as sulfides. While the method of this invention is applicable in general to these metal sulfide ores, for example copper (I–B), zinc (II–B), lead (IV–A), antimony (V–A), manganese (VII–B) and iron and nickel (VIII), the method has been found particularly suitable for lead, nickel, zinc, copper and iron with the best results being obtained for the sulfides of lead and of nickel. In addition the method of this invention is suitable for ores which are sulfides of more than one of these metals, for example, chalcopyrite, $CuFeS_2$.

It will be understood, of course, that in view of the exceedingly complex ores that are found in nature, not all of such ores are equally amenable to the process of this invention as is true for all metallurgical refining processes. Moreover, in addition to the complexity of the ores themselves they also are admixed, even after concentration, with a wide variety of non-metalliferous material.

In carrying out the method of the instant invention the metal sulfide ore is slurried in an aqueous system with the organic hydroperoxide and the mineral acid. The quantities of the organic hydroperoxide and the mineral acid are determined by the stoichiometry of the reaction and the valence state of the metal in the ore. Thus, for example, with galena (lead sulfide) using sulfuric acid the reaction is $$PbS + TBHP\ ^a + H_2SO_4 \rightarrow PbSO_4 + TBA\ ^b + H_2O + S$$

In other words, there would be a 1:1:1 mole ratio of lead sulfide to hydroperoxide to acid. Similarly, nickel sulfide would require the same mole ratio on a theoretical basis. It is preferable, of course, to employ some excess of both hydroperoxide and acid in order to obtain a maximum conversion of the sulfide. If the metal of the ore is in a lower valence state, for example cuprous sulfide, $Cu_2S$, there will be required 2 moles of hydroperoxide and 2 moles of acid per mole of the sulfide. Obviously, with more complex ores the stoichiometry of the reaction becomes more complex, but in general, it is preferred to employ an excess of both the hydroperoxide and acid over that called for by the stoichiometry and valence state of the metal. An excess of from 0.05 to 0.5 moles over theoretical can be employed although it will be understood that large excesses simply add to the cost of the processes.

The reaction can be carried out at temperatures ranging from about 25° C., normal ambient temperatures, to about 90° C. and preferably in the range of from 25° C. to 70° C. with 40° C. to 60° C. being particularly preferred. The reaction time can range from 72 hours or longer at ambient temperatures (25° C.) to as short as 1 to 2 hours at the 70° C. to 90° C. end of the temperature range. From 3 to 20 hours can be used at about 50° C., for example. In addition, reaction times and temperatures are a function of the particular type of ore being treated since some ores are considerably more resistant to oxidation by this method than are other ores.

The organic hydroperoxide which is generally produced by the oxidation of the corresponding hydrocarbons, i.e. isobutane in the case of tertiary butyl hydroperoxide, or ethylbenzene in the case of ethylbenzene hydroperoxide, also may be admixed with the alcohol which is concurrently produced in such oxidation reactions. Thus, the isobutane oxidate contains approximately equimolar quantities of tertiary butyl hydroperoxide and tertiary butyl alcohol and this oxidate can be used directly without separation of the alcohol in the method of this invention. This provides an additional saving, since upon reaction, the tertiary butyl hydroperoxide is reduced to tertiary butyl alcohol and thus only a single recovery step is required to obtain the tertiary butyl alcohol as a valuable by-product.

It is also preferred to use an aqueous system such that the sulfuric acid or other acid is in the diluted form. In general acid concentrations ranging from about 2 weight percent to 50 weight percent of the acid in water are suitable with from about 10 weight percent to 45 weight percent being preferred. This is, of course, advantageous when hydrochloric acid is used since this provides greater safety and ease of handling such acid. Nitric acid is less preferred since it may produce oxides of nitrogen which are polluting and require recovery. The two acids most preferred are sulfuric acid, $H_4SO_2$, and phosphoric acid, $H_3PO_4$. Stoichiometric amounts or a small excess are preferred.

As has been pointed out metal sulfide ores are seldom a single metal sulfide, but instead, even after concentration, contain small amounts of other metal sulfides in addition to the principal metal sulfide of the ore. Accordingly, in the Examples which follow except where noted, the pure metal sulfide was employed in order to determine the stoichiometry of the reaction, the yields obtainable, and to show the utility of the process. By using the pure metal sulfide the analytical procedures were greatly simplified, but it is obvious that if the process is operable on the pure compounds it is also operable when these compounds are in the form of their naturally occurring ores.

The hydroperoxides used were those obtained commercially, for example, the tertiary butyl hydroperoxide is a 41.6 weight percent solution in admixture with an approximately equal amount of tertiary butyl alcohol and small amounts of other oxidation products obtained by the direct thermal oxidation of isobutane in a commercial unit. Similarly the ethylbenzene hydroperoxide was contained in ethylbenzene in the form of a relatively dilute solution since commercially high conversions of ethylbenzene to the hydroperoxide are avoided. In all cases after the reaction had been carried out the alcohol

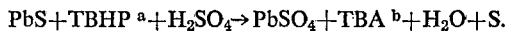
a TBHP is tertiary butyl hydroperoxide.
b TBA is tertiary butyl alcohol.

corresponding to the reduced hydroperoxide was obtained.

The following Examples are provided to illustrate the invention further, but these Examples should not be construed as limiting the invention solely to their disclosures.

EXAMPLE I

A slurry of 10 g. (0.04 mole) PbS, 25 g. water, 4.1 g. concentrated (96+ weight percent) sulfuric acid (0.04 mole), 9.0 g. isobutane oxidate having a tertiary butyl hydroperoxide content of 41.6 weight percent (0.04 mole tertiary butyl hydroperoxide) was heated with stirring at 50° C. for 2½ hours and then stirred overnight at room temperature, i.e. approximately 16 hours. After filtration, water washing and drying there was obtained 13.15 g. of solids. Titration of the aqueous filtrate showed that 92 weight percent of the tertiary butyl hydroperoxide had reacted. The solids were then extracted with carbon disulfide to remove the sulfur and after evaporation of the carbon disulfide there was obtained 1.01 g. of sulfur. Based on the amount of tertiary butyl hydroperoxide reacted this represented about 80 weight percent of the sulfur expected on a stoichiometric basis. The solid was shown by X-ray diffraction to be predominantly lead sulfate, together with a small amount of unreacted lead sulfide. No attempt was made to optimize reaction conditions such as time, temperature, amounts of reactants, etc., however, these data indicate that optimization would give sulfur and lead sulfate approaching their theoretical values.

EXAMPLE II

In order to show that other hydroperoxides, i.e. the secondary types can be used, a run was carried out wherein ethylbenzene hydroperoxide was substituted for tertiary butyl hydroperoxide. A slurry of 10 g. PbS, 25 g. of water, 4.1 g. concentrated (96+ weight percent) sulfuric acid and 68 g. of ethylbenzene containing 8.5 weight percent ethylbenzene hydroperoxide (0.04 mole) was heated for 4 hours at 50° C. with stirring. The reaction mixture was filtered, washed with water and dried giving 12.32 g. of solids. These were extracted with carbon disulfide and after evaporation 0.22 g. of sulfur was obtained. It was found subsequently that the remainder of the sulfur had remained dissolved in the ethylbenzene and this remainder was recovered by evaporation of the hydrocarbon. The remaining solid was predominantly lead sulfate with a small amount of unreacted lead sulfide. Titration of the filtrate showed that 83 weight percent of the ethylbenzene hydroperoxide had reacted. This run demonstrated the feasibility of employing secondary hydroperoxides in the process of this invention, but as in Example I, no attempt was made to optimize the reaction conditions.

EXAMPLE III

In order to demonstrate the necessity of employing the organic hydroperoxide together with the mineral acid such as sulfuric acid a run was made in which 10 g. PbS was heated with 4.1 g. concentrated (96+ weight percent) sulfuric acid and 35 g. water, at 50° C. for 4 hours. The mixture was stirred overnight at room temperature, i.e. about 19 hours, and thereafter the product was recovered as in Examples I and II. The solid obtained weighed 10.4 g. and 0.09 g. sulfur was obtained by carbon disulfide extraction. This run demonstrated that substantially no conversion of lead sulfide to lead sulfate occurs in the absence of the hydroperoxide. It was also found that a small amount of sulfur was obtained on direct extraction of lead sulfide by carbon disulfide indicating that this original lead sulfide sample employed contained a very small amount of sulfur.

EXAMPLE IV

A series of 3 runs were made using a 6:1 mole ratio of tertiary butyl hydroperoxide to lead sulfide in the absence of acid and with traces of sulfuric acid. Each run was at 50° C. for 3 hours. Some lead sulfate was identified by X-ray diffraction in the solid (recovered as in the previous examples), but only sraces of sulfur as in Example III. These runs demonstrated that with an extremely large excess of the hydroperoxide some oxidation is obtainable but such process obviously is not competitive with existing roasting process with sulfur dioxide recovery processes and thus is not within the scope of this invention.

EXAMPLE V

A run was carried out on nickel sulfide with tertiary butyl hydroperoxide in the presence of sulfuric acid and it was found that the reaction was very rapid and exothermic. Approximately equimolar quantities of nickel sulfide, 10 g., concentrated sulfuric acid, 10.8 g., and tertiary butyl hydroperoxide, 23.8 g., of 41.6 weight percent tertiary butyl hydroperoxide together with 50 g. of water were reacted at 50° C. The exothermic reaction increased the temperature to over 70° C. for a short period of time. After reacting for 3 hours it was found that approximately 80 weight percent of the nickel sulfide was converted to nickel sulfate and about 70 weight percent of the theoretical amount of sulfur was recovered by carbon disulfide extraction of the solid residue. This residue was obtained in the same manner as in the previous Examples. In another run the reaction temperature was kept below 40° C. by cooling and approximately 80 percent of the theoretical amount of sulfur was recovered. In all cases all of the tertiary butyl hydroperoxide had reacted. These runs demonstrated the method of this invention can be used on nickel sulfide ores, although no attempt was made to optimize all of the reaction conditions.

EXAMPLE VI

Runs were carried out on cobalt sulfide similar to Example I, i.e. 1:1:1 mole ratio of sulfide to acid to hydroperoxide with the acid diluted and a reaction time of 3 hours. Although all of the hydroperoxide was converted when the reaction was carried out a 66° C. only about 27 weight percent of the sulfide was converted to the sulfate.

EXAMPLE VII

A run like to that of Example I was carried out on zinc sulfide and after 3 hours at 50° C. a 19 weight percent conversion of zinc sulfide to zinc sulfate and a 33 weight percent conversion of tertiary butyl hydroperoxide was obtained with approximately 55 weight percent of the theoretical amount of sulfur recovered by extraction.

EXAMPLE VIII

In order to demonstrate the utility of the instant process on copper ores a number of runs were carried out on cuprous sulfide. In a typical run 10 g. of cuprous sulfide, 12.3 g. of concentrated (96+ weight percent) sulfuric acid, 25 g. of 41.6 weight percent of tertiary butyl hydroperoxide solution and 50 g. of water were reacted with stirring at 50° C. for 4 hours. There was obtained 4.85 g. of solid after filtration and washing. No free sulfur was produced and the solid was found to be cupric sulfide (CuS). The copper sulfate produced remained in the aqueous solution together with 30 weight percent of the original tertiary butyl hydroperoxide which had not reacted. These runs demonstrated that the reaction which was occurring was predominantly oxidation of the cuprous ion to the cupric ion and with only a portion being converted to copper sulfate. None of the runs completely solubilized the copper. Accordingly, additional runs were carried out on cupric sulfide as set forth in the following Examples.

EXAMPLE IX

A run was carried out employing 10 g. of cupric sulfide (CuS), 10.3 g. concentrated (96+ weight percent) sulfuric acid, 25 g. of the tertiary butyl hydroperoxide solution of 41.6 weight percent concentration and 50 g. of water. The reaction was carried out at 50° C. for 19½ hours. There was obtained 7.00 g. of solid from which 0.48 g. of sulfur was extracted. It was found that 33 weight percent of the tertiary butyl hydroperoxide was unreacted. The solids from this run consisting of cupric sulfide was then admixed with 6.87 g. of the concentrated sulfuric acid, 16.7 g. of the tertiary butyl hydroperoxide solution and 33.4 g. of water. The reaction was carried out for 4¾ hours at 50° C. and 5.14 g. of solid was obtained from which 0.20 g. of sulfur was extracted. It was found that 46 weight percent of the tertiary butyl hydroperoxide remained unreacted. These runs demonstrated that the cupric sulfide is amenable to recycle so that it can be finally converted entirely to cupric sulfate and sulfur.

EXAMPLE X

In another series of runs it was further demonstrated that cupric sulfide can be recycled to extinction, i.e. converted to copper sulfate and sulfur. In the first run 10 g. of cupric sulfide, 10.3 g. of concentrated sulfuric acid, 50 g. of the 41.6 weight percent concentration tertiary butyl hydroperoxide solution and 50 g. of water were reacted at room temperature (25° C.) for 72 hours. There was obtained a filtrate containing the copper sulfate and 6.38 g. of solid from which 0.57 g. of sulfur was extracted. This extracted solid consisting of the unreacted cupric sulfide was used as the charge for the second run. In the first run it was found that 75 weight percent of the tertiary butyl hydroperoxide remained unreacted. In the second run the aforementioned solid from the first run was admixed with 6.2 g. concentrated sulfuric acid, 30 g. of tertiary butyl hydroperoxide solution and 30 g. of water. These were reacted at room temperature (25° C.) for 48 hours and there was obtained 3.79 g. of solid from which 0.44 g. of sulfur was extracted. The remainder of the copper was in the filtrate in the form of copper sulfate together with 76 weight percent unreacted tertiary butyl hydroperoxide. The extracted solids consisting of copper sulfide from the second run was utilized as the charge for the third run. These solids were admixed with 3.5 g. concentrated sulfuric acid, 17 g. of the tertiary butyl hydroperoxide solution and 17 g. of water. The reaction was carried out at 25° C. for 72 hours, and there was obtained 2.19 g. of solids from which 0.30 g. of sulfur were extracted. The copper sulfate produced remained in the filtrate solution together with 58 weight percent unreacted tertiary butyl hydroperoxide. These runs demonstarted that it is possible to recycle the cupric sulfide to extinction converting it to copper sulfate and sulfur.

EXAMPLE XI

In order to show the applicability of the instant invention to iron ores 10 g. of ferrous sulfide was slurried with 10 g. of water and to this slurry was added over a 75 minute period a mixture of 70 g. of water, 18 g. of concentrated sulfuric acid and 38 g. of the same tertiary butyl hydroperoxide solution utilized in the foregoing Examples, i.e. an isobutane oxidate containing 41.6 weight percent tertiary butyl hydroperoxide. After stirring overnight (about 19 hours) at room temperature the mixture was filtered and the solid amounting to 5.72 g. was extracted with carbon disulfide and, thereby obtaining 0.45 g. of sulfur. Analysis showed that 83.5 weight percent of the tertiary butyl hydroperoxide had been converted. This Example demonstrates the operability of the instant invention on iron sulfide ores.

EXAMPLE XII

A mixture of 10 g. of cuprous sulfide ($Cu_2S$), 20 g. of water, 20 g. of 85 weight percent concentrated phosphoric acid ($H_3PO_4$) and 30 g. of the tertiary butyl hydroperoxide solution utilized in the previous Example was stirred at room temperature for 4 days. The product was filtered giving about 16.4 g. of solid. This solid was composed of cupric phosphate, cupric sulfide and sulfur. The solid was treated with an excess of 20 percent sulfuric acid to convert the cupric phosphate to copper sulfate which is soluble and gives a residue of 2.96 g. from which 0.29 g. of sulfur was extracted with carbon disulfide leaving the remainder of cupric sulfide. Analysis showed that 78 weight percent of the tertiary butyl hydroperoxide had reacted. This Example demonstrates that phosphoric acid also gives excellent results in the method of this invention.

EXAMPLE XIII

A mixture of 10 g. chalcopyrite ore concentrate ($CuFeS_2$) containing about 26 weight percent copper, 50 g. of water, 20 g. of 85 weight percent phosphoric acid, and 23.5 g. of the isobutane oxidate of 41.6 weight percent tertiary butyl hydroperoxide was heated with stirring for about 19 hours at 50° C. The mixture was cooled and filtered leaving 7.0 g. of solid material. Analysis of the solution showed that about 80 weight percent of the tertiary butyl hydroperoxide had reacted and that over 50 weight percent of the copper had been extracted from the chalcopyrite, the process being considerably more selective for the copper removal than for the iron. The iron extracted was less than one-third that of the copper. The residue was treated with dilute sulfuric acid and extracted with carbon disulfide leaving 6.32 g. residue (unextracted copper, iron and non-metallic material) and obtaining 0.43 g. sulfur. This run demonstrated that the process is suitable for the refining of naturally occurring ores including complex metal sulfide compounds.

I claim:

1. A method for the oxidation of metal sulfide ores without the production of sulfur dioxide which comprises contacting the metal sulfide ore with a secondary or tertiary organic hydroperoxide in the presence of an aqueous solution of a mineral acid at temperatures ranging between about 25° C. and 90° C. under atmospheric pressure wherein the concentration of said acid ranges from 2 weight percent to 50 weight percent to produce the corresponding metal salt, free sulfur and the alcohol corresponding to the reduced hydroperoxide.

2. The method according to Claim 1, wherein the metal of the said metal sulfide ores is selected from the metals of Group I–B, II–B, IV–A, V–A, VII–B, and VIII of the Periodic Table.

3. The method according to Claim 1, wherein the metal of said metal sulfide is selected from the group consisting of copper, zinc, lead, iron and nickel.

4. The method according to Claim 1, wherein the metal sulfide is lead sulfide.

5. The method according to Claim 1, wherein the metal sulfide is nickel sulfide.

6. The method according to Claim 1, wherein the contacting temperature is in the range of from about 25° C. to 70 C.

7. The method according to Claim 1, wherein said concentration ranges between 10 weight percent and 45 weight percent.

8. The method according to Claim 1, wherein the organic hydroperoxide is tertiary butyl hydroperoxide.

9. The method according to Claim 8, wherein the organic hydroperoxide is tertiary butyl hydroperoxide contained in the oxidate by the thermal oxidation of isobutane.

10. The method according to Claim 1, wherein the organic hydroperoxide is ethylbenzene hydroperoxide.

11. The method according to Claim 1, wherein an excess of organic hydroperoxide and mineral acid over that required by the stoichiometry of the reaction is employed with said excess ranging from 0.05 to 0.5 moles for said hydroperoxide and for said acid.

12. A method for the oxidation of metal sulfide ores without the production of sulfur dioxide which comprises contacting the metal sulfide ore with a secondary or tertiary organic hydroperoxide in the presence of an aqueous solution of sulfuric acid or phosphoric acid at temperatures ranging between about 25° C. to 70° C. wherein the concentration of said acid ranges from 2 weight percent to 50 weight percent to produce the corresponding metal salt, free sulfur and the alcohol corresponding to the reduced hydroperoxide.

13. The method according to Claim 12 wherein said organic hydroperoxide is tertiary butyl hydroperoxide or ethylbenzene hydroperoxide.

14. The method according to Claim 13, wherein the acid is sulfuric acid having a concentration ranging from 10 weight percent to 45 weight percent.

15. The method according to Claim 14, wherein the metal sulfide is lead sulfide.

16. The method according to Claim 14, wherein the metal sulfide is nickel sulfide.

17. The method according to Claim 14, wherein the metal sulfide is cupric sulfide.

18. The method according to Claim 13, wherein the acid is phosphoric acid having a concentration of from 10 weight percent to about 45 weight percent.

19. The method according to Claim 18, wherein the metal sulfide is cuprous sulfide.

20. The method according to Claim 18, wherein the metal sulfide is chalcopyrite.

References Cited

Chemical Abstracts, vol. 74, 1971, 60390q.

OSCAR R. VERTIZ, Primary Examiner

G. A. HELLER, Assistant Examiner

U.S. Cl. X.R.

423—27, 38, 98, 109, 305, 571